3,741,975
PROCESS FOR THE PRODUCTION OF N-ETHYL-N-(γ-PICOLYL) TROPAMIDE AND INTERMEDIATE THEREFOR
Nobuo Toshioka, Osaka, Shigeo Okumura, Takarazuka, and Itaru Mita, Ashiya, Japan, assignors to Santen Pharmaceutical Co., Ltd., Osaka, Japan
No Drawing. Filed Dec. 11, 1970, Ser. No. 97,374
Claims priority, application Japan, Jan. 9, 1970, 45/2755
Int. Cl. C07d 31/44
U.S. Cl. 260—295 AM
2 Claims

ABSTRACT OF THE DISCLOSURE

The present invention relates to a process for the production of N-ethyl-N-(γ-picolyl)-tropamide and intermediate therefor. The said process is characterized by the steps of:
(a) reacting phenyl acetic acid chloride with N-ethyl-γ-picolylamine to form N - ethyl-N-(γ-picolyl)-phenylacetamide,
(b) formylating said N-ethyl-N-(γ-picolyl)-phenylacetamide with alkyl formate and then
(c) reducing an aldehyde radical of the amide thus obtained.

---

The present invention relates to a process for the production of tropic acid N-ethyl-N-(γ-picolyl)-amide or N-ethyl-N-(γ-picolyl)-tropamide and intermediate thereof.

The aforementioned N-ethyl-N-(γ-picolyl)-tropamide (so called tropicamide) possesses an anaesthetizing reaction to the parasympathetic nerve and is a superior mydriatics characterized by being far active and short in duration of action compared to atropine, homatropine and others; a process for manufacture thereof by Gerald Rey-Bellet et al. having been disclosed in the publication of the Japanese Letters Patent No. 215,463 as follows.

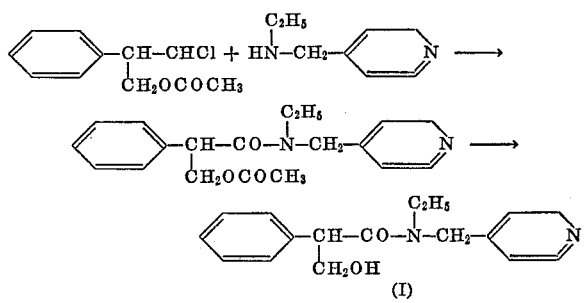

However, under the manufacturing process disclosed in said patent, since tropic acid wherein oxymethyl radical is bonded to activated methylene radical interposed between phenyl radical and carbonyl radical, is being used as basic material thereby causing side reactions such as dehydration, deacetylation and others during the process for manufacture, it is difficult to obtain a pure final product at high yield.

We have made various studies taking this point into consideration and, as a result, have succeeded on obtaining the final product (I at a high yield and high purity a) voiding side reactions by introducing reactive hydroxymethyl radical into phenylacetic acid derivative at the final step of manufacturing process.

The reaction formula of the process for production of this invention is shown as follows.

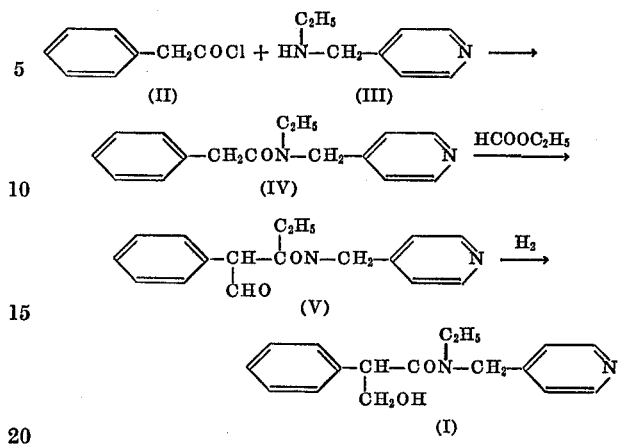

That is, when N-ethyl-γ-picolylamine (III) is reacted with phenylacetic acid chloride (II) in the presence of pyridine in a proper solvent, N-ethyl-N-(γ-picolyl)-phenylacetamide (IV) can be obtained at a quantitative yield. The essential part of this invention is based upon the discovery of an advantageous method for introducing formyl radical into this acid amide product (IV).

We have accomplished to obtain formyl product (V) at an extremely good yield by reacting the acid amide product in the presence of natrium-alcoholate as a catalyst with ethyl formate in toluene. In this instance, it is possible to perform the reaction by using metallic sodium as a condensing agent.

Next, the final process is of reduction of formyl product to primary alcohol (I); and it has been found that it would be possible to use the reductive reaction such as reduction with hydrogen metal compound, catalytic reduction, Meerwein's and Ponndorf's reductions and others. Above all, it was possible to obtain the most satisfactory result by using the hydrogen metal compound, particularly the sodium borohydride.

The intermediates of this manufacturing process, which are N-ethyl-N-(γ-picolyl)-phenylacetamide (IV) and N-ethyl-N-(γ-picolyl)-α-formyl-phenylacetamide (V), are both new compounds not yet disclosed in any literature heretofore.

N-ethyl-γ-picolylamine is produced by reacting 4-halogen methylpyridine with ethylamine according to the aforementioned patent by G. Rey-Bellet et al., however we have accomplished to produce N-ethyl-γ-picolylamine at a quantitative yield by the reductive amination reaction of pyridine-4-aldehyde.

That is, when Schiff base obtained by reacting pyridine-4-aldehyde with ethylamine is reduced catalytically, hydrogen is quantitatively absorbed to said Schiff base and, as the result, N-ethyl-γ-picolylamine as the final product (III) is obtained. Alcholos are suitable as solvent for reductive reaction, and especially it has been possible to gain a quantitative yield by performing the reduction in the presence of Raney nickel-catalyst under heating, using isopropylalcohol as solvent. Further, it is possible to perform the reductive amination without isolating the Schiff base at the time of the reduction.

The following is the explanation citing the working examples of this invention.

EXAMPLE 1

N-ethyl-γ-picolylamine (III)

25 grams of pyridine-4-aldehyde was dissolved in 90 ml. of 95% ethanol, added 45 grams of a solution of 70% ethylamine and the mixture was allowed to stand for overnight. After vaporizing the solvent from the mixture, the mixture was distilled under the decreased pressure to obtain the Schiff base. There was obtained 30 grams of the Schiff base having boiling point of 86–87° (4 mm. Hg).

25 grams of the Schiff base thus obtained was dissolved in 80 ml. of isopropylalcohol, added 5 grams of Raney nickel and reduced for 2 hours under 60 atms. and at the temperature of 60–70°. After filtering off the catalyzer, the mixture was distilled under the decreased pressure to obtain 20.4 grams (theoretical yield of 80.5%) of N-ethyl-γ-picolylamine having boiling point 103–105° (8–11 mm. Hg).

EXAMPLE 2

N-ethyl-N-(γ-picolyl)-phenylacet-amide (IV)

15 grams of N-ethyl-γ-picolylamine was dissolved in a mixture of anhydrous-chloroform 120 ml. and pyridine 11 gram, and was added dropwise a solution of phenylacetic acid chloride 19 grams and chloroform 10 ml. being cooled with ice. After dropping was completed, the mixture was stirred up for 1–2 hours at a temperature of 25°. Then the chloroform layer was obtained after hydrolysis and distillation under decreased pressure was conducted to obtain the object having boiling point of 224–226° (3 mm. Hg). Yielding quantity was 25.3 gram (theoretical yield of 90.5%). IR Voil. max. 1640, 1450, 1420, 1370, 1120, 995, 980, 795, 735 cm.$^{-1}$.

EXAMPLE 3

N-ethyl-N-(γ-picolyl)-trop-amide (I)

Anhydro-toluene 20 ml. was added to sodium methylate prepared from 1.1 grams of metallic sodium. A solution obtained by dissolving 10 grams of N-ethyl-N-(γ-picolyl)-phenylacetamide compound in advance according to the above Example 2 and 4 grams of ethyl formate into anhydrous-toluene 10 ml. was stirred in dropwise to the above solution. After dropping was over, it was stirred for 20 hours at an indoor temperature, water was added and insoluble substance was distilled off by use of ether. After neutralization of water layer with acetic acid was performed, the object was distilled off by use of chloroform and chloroform was evaporated to obtain 10.95 grams (theoretical yield being 99.0%) of oily N-ethyl-N-(γ-picolyl)-α-formyl-phenylacet-amide (V). IR Voil. max. 3500–2400, 1730, 1630, 1420, 1120, 1070, 760 cm.$^{-1}$.

5 grams of this formyl product (V) was dissolved in 80% dioxane solution 35 ml. Then this solution was dropped at 0–5° costing 25 minutes into a solution obtained by dissolving 0.25 gram of sodium borohydride in 80% dioxane solution 35 ml. After the dropping was finished it was stirred for one hour at a temperature of 30° in order to have the reaction completed. Next, 60 ml. of 6 N hydrochloric acid was added and mixed by stirring for 30 minutes at 50° C., neutralized with aqueous solution of ammonia, distilled off with chloroform and after chloroform was evaporated, approximately 5 grams (theoretical yield being 99.0%) of tropic acid crudum N-ethyl-N-(γ-picolyl)-amide was obtained. This was recondensed from acetone to obtain tropic acid N-ethyl-N-(γ-picolyl)-trop-amide (I) of which the melting point was 96–97°. This crystal does not show a drop of melting point when mixed and dissolved with the specimen of already known tropicamide. Further, they are the same and sole substance under infrared and ultraviolet spectrums, paper chromatography, film chromatography and gas chromatography.

EXAMPLE 4

N-ethyl-N-(γ-picolyl)-trop-amide (I)

4 grams of formyl product (V) obtained from Example 3 and 3 grams of aluminum isopropylate was dissolved in 50 ml. of anhydrous-isopropyl-alcohol, and distilled for six hours at a rate of 10 drops per minute. After being cooled off, 30 ml. of dilute hydrochloric acid was added, treated in the same way as Example 3 and 4 grams of N-ethyl-N-(γ-picolyl)-trop-amide could be obtained. This crystal corresponded with the already known specimen under infrared spectrum and film chromatography.

What we claim is:
1. N-ethyl-N-(γ-picolyl)-phenylacetamide.
2. N-ethyl-N-(γ-picolyl)-α-formylphenylacetamide.

References Cited

UNITED STATES PATENTS 3,123,614  3/1964  Yale et al. _____ 260—296

FOREIGN PATENTS 765,019  1/1957  Great Britain ____ 260—295 AM

OTHER REFERENCES

Fieser & Fieser, Reagents For Organic Synthesis, Vol. I, Wiley Publishers, page 1080 (1967).

ALAN L. ROTMAN, Primary Examiner

U.S. Cl. X.R.

260—296 R; 424—266